United States Patent [19]

Shofner et al.

[11] Patent Number: 5,628,860

[45] Date of Patent: May 13, 1997

[54] DIELECTRIC-HEATED, CONTINUOUS LAYUP LAMINATED VENEER LUMBER PRESS

[75] Inventors: Gordon G. Shofner, Louisville, Ky.; William N. Perry, Sonora, Calif.

[73] Assignees: Durand-Raute Industries Ltd., British Columbia, Canada; Thermex-Thermatron, Inc., Bay Shore, N.Y.

[21] Appl. No.: 493,210

[22] Filed: Jun. 20, 1995

Related U.S. Application Data

[62] Division of Ser. No. 322,102, Oct. 12, 1994, abandoned.

[51] Int. Cl.⁶ .................................................. B32B 31/00
[52] U.S. Cl. ........................ 156/274.4; 156/380.4; 156/380.6
[58] Field of Search .................... 156/272.2, 274.4, 156/379.6, 379.8, 380.2, 380.3, 380.4, 380.6, 380.8, 580, 581, 583.1, 583.4

[56] References Cited

U.S. PATENT DOCUMENTS

| | | | |
|---|---|---|---|
| 2,667,437 | 1/1954 | Zoubek | 156/273 |
| 2,706,165 | 4/1955 | Korsgaard | 154/126.5 |
| 3,632,943 | 1/1972 | Engler et al. | 219/10.79 |
| 4,323,409 | 4/1982 | Alt | 156/219 |
| 5,250,140 | 10/1993 | Hayashi et al. | 156/380.5 |

Primary Examiner—James Sells
Attorney, Agent, or Firm—Oyen Wiggs Green & Mutala

[57] ABSTRACT

A continuous layup LVL press having upper and lower parallel, opposed platens separated by a variable distance. An RF energy source is coupled between the platens. RF deflectors are provided on each opposed end of each platen, with the deflectors projecting outwardly away from respective inner edges of the platens. The deflectors may be triangular in a cross-sectional plane of the press; or, they may be arcuate in cross-section. Additional RF deflectors may be provided on each opposed longitudinal edge of each platen, with the additional deflectors projecting outwardly away from respective inner longitudinal edges of the platens.

7 Claims, 6 Drawing Sheets

DIELECTRIC-HEATED, CONTINUOUS LAYUP LAMINATED VENEER LUMBER PRESS

This is a divisional of application Ser. No. 08/322,102 filed on Oct. 12, 1994, abandoned.

FIELD OF THE INVENTION

This application pertains to the fabrication of laminated veneer lumber in a continuous layup press having opposed dielectric heating platens which subject a glued laminate billet to RF heating energy to cure the glue and bond the laminates together.

BACKGROUND OF THE INVENTION

Laminated veneer lumber ("LVL") is a structural wood composite incorporating characteristics of both plywood and sawn lumber. Like plywood, LVL is made of adhesively bonded wood veneer sheets. But, whereas plywood is cross-banded, the veneer in LVL is bonded with the grain in each sheet running parallel, similar to sawn lumber. Because any veneer defects tend to be distributed evenly in LVL, dimensional flaws characteristic of sawn lumber are minimized, resulting in improved LVL structural properties.

In LVL manufacture, the ends of the individual veneer sheets are joined by either a lap, butt or scarf joint, with the joints being staggered throughout the cross-section of the LVL "billet". Glue is applied to the opposed, outer faces of each veneer sheet, excepting the two outermost surfaces. The glued sheets are laid atop one another to form the billet, which is then compressed and heated, firmly bonding the veneer into a single piece of LVL having superior strength characteristics.

LVL may be made in a fixed length press or in a continuous layup press. In a fixed length press the entire billet fits between a pair of opposed platens which compress and heat the billet. In a continuous layup press only part of the billet fits between the platens; the remaining part of the billet protrudes outside the platens.

A continuous layup press cures the billet in stages. After a controlled interval, the platens are opened and the billet is advanced longitudinally with respect to the platens. This removes the cured part of the billet from the press and places the adjacent uncured part between the platens for another controlled interval. The process is repeated until a desired length of the billet is cured. That length can then be cut of the billet for use. Alternatively, the entire billet can be cured in stages as aforesaid to yield a single piece of LVL.

Continuous layup presses are more versatile than fixed length presses: a comparatively short continuous layup press can make LVL in varying lengths, any of which may be considerably longer than the press platens. But, the maximum length of LVL made by a fixed length press is restricted by the length of the press platens.

LVL presses typically use hot oil heating systems. Alternatively, dielectric heating systems which make use of an effect in which the opposed press platens act as the plates of a very large parallel plate capacitor are sometimes used. The platens are coupled to a radio frequency ("RF") energy source, whereby RF energy is radiated between the platens and thus through the billet. This heats the wood and promotes curing of the glue as the platens are compressed toward one another.

Although it would be desirable to employ dielectric heating in a continuous layup press, problems have been encountered in doing so. RF energy "leaks" from between the RF heating platens and flows laterally along the glue lines within the uncured billet portion which protrudes outside the RF heating platens. Such leakage causes premature curing and/or burning of the glue in the billet portion outside the heating platens, preventing proper compression of that portion when it is subsequently advanced between the platens for heating and compression.

The present invention overcomes the foregoing problems, thus making practical the use of a dielectric heating effect in a continuous layup LVL press.

SUMMARY OF THE INVENTION

The invention provides a continuous layup LVL press having upper and lower parallel, opposed platens having a separation distance therebetween and a means for changing the separation distance. An RF energy source is coupled between the platens. RF deflectors are provided on each opposed end of each platen, with the deflectors projecting outwardly away from respective inner edges of the platens.

The deflectors may be triangular in a cross-sectional plane of the press; or, they may be arcuate in cross-section. Additional RF deflectors may be provided on each opposed longitudinal edge of each platen, with the additional deflectors projecting outwardly away from respective inner longitudinal edges of the platens.

The invention also provides a method of making laminated veneer lumber in a continuous layup press having opposed press platens coupled to an RF energy source. The platen ends are shaped in a cross-sectional plane of the press, such that the ends project outwardly away from respective inner edges of the platens. Part of a glued laminate billet is advanced longitudinally to position the billet between the platens. For a pre-determined time interval, the RF energy source is activated while the billet is compressed between the platens. The platens are then released and the billet is advanced to position a next adjacent part of the billet between the platens. The process continues until the billet has advanced completely through the press.

DETAILED DESCRIPTION OF THE PREFERRED EMBODIMENT

Figure 1:
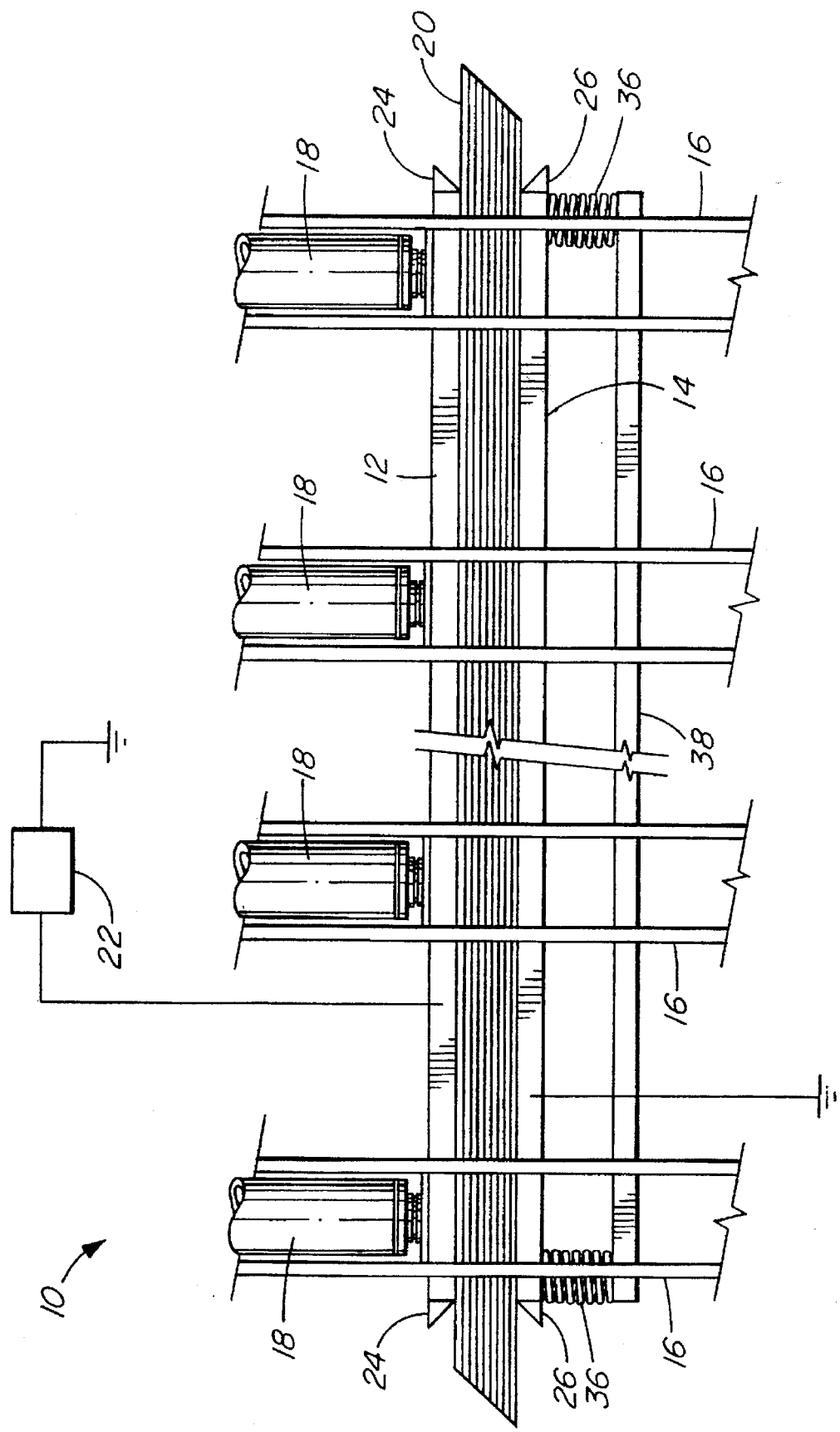
FIG. 1 is a fragmented front elevation view of a continuous layup LVL press adapted for dielectric heating in accordance with the invention.

FIG. 1 depicts a continuous layup LVL press 10 having opposed upper and lower platens 12, 14 supported by frame members 16. Hydraulic rams 18 are coupled between upper platen 12 and an overhead support structure (not shown). Rams 18 may be controllably actuated to move upper platen 12 toward or away from lower platen 14 in order to compress billet 20 between the platens, or release it therefrom.

An RF energy source 22 such as a THERMEX™ 350 kilowatt high frequency dielectric LVL heating system available from Thermex-Thermatron, Inc. of Bay Shore, N.Y., U.S.A. is electrically coupled between platens 12, 14. RF energy source 22 may be controllably actuated to radiate RF energy between platens 12, 14 and thus through the portion of billet 20 which lies between platens 12, 14.

Figure 2:
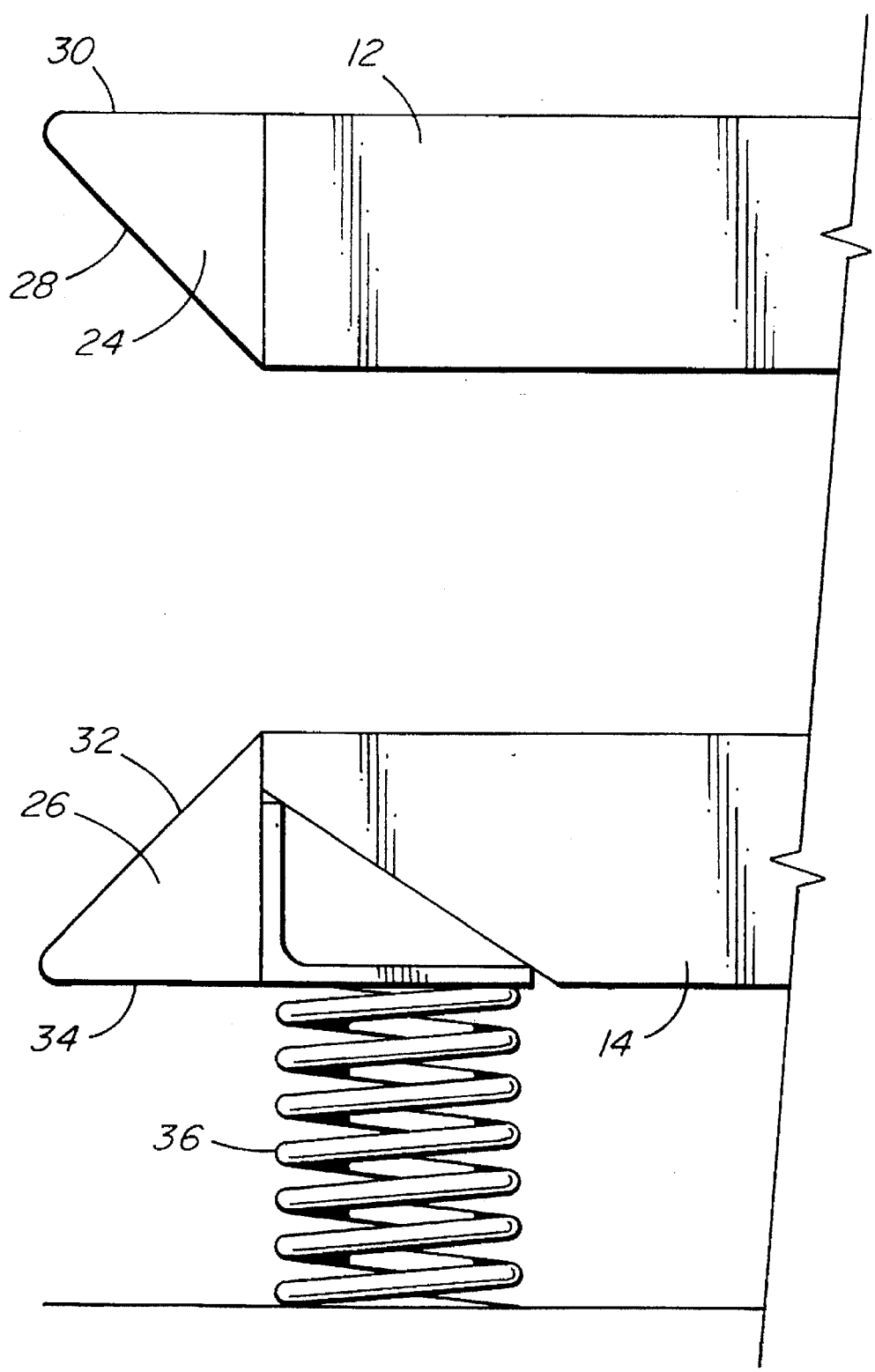
FIG. 2 is an enlarged side elevation view of one end of the FIG. 1 press.
Figure 3:
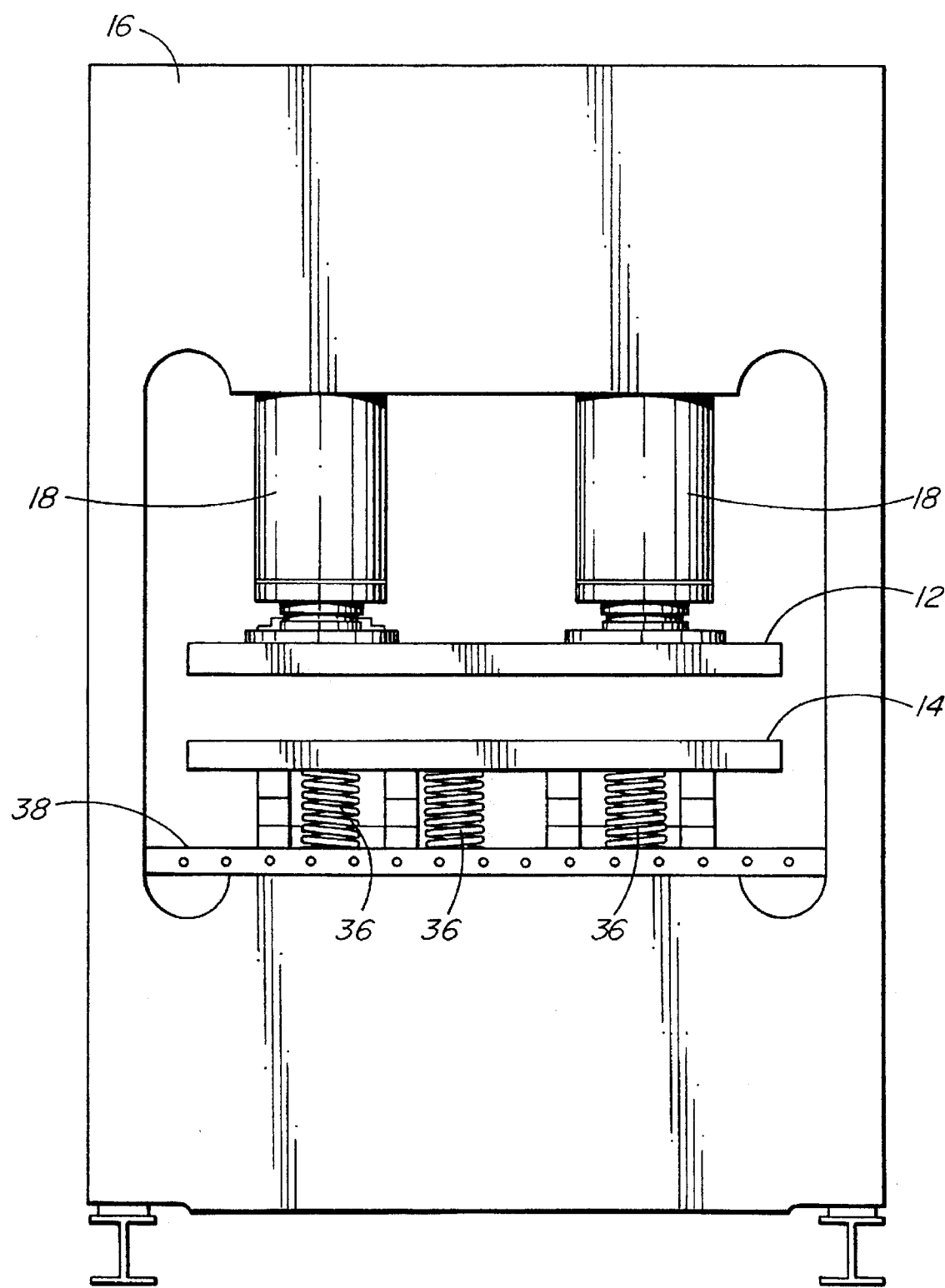
FIG. 3 is an enlarged front elevation view of the FIG. 1 press.
Figure 4:
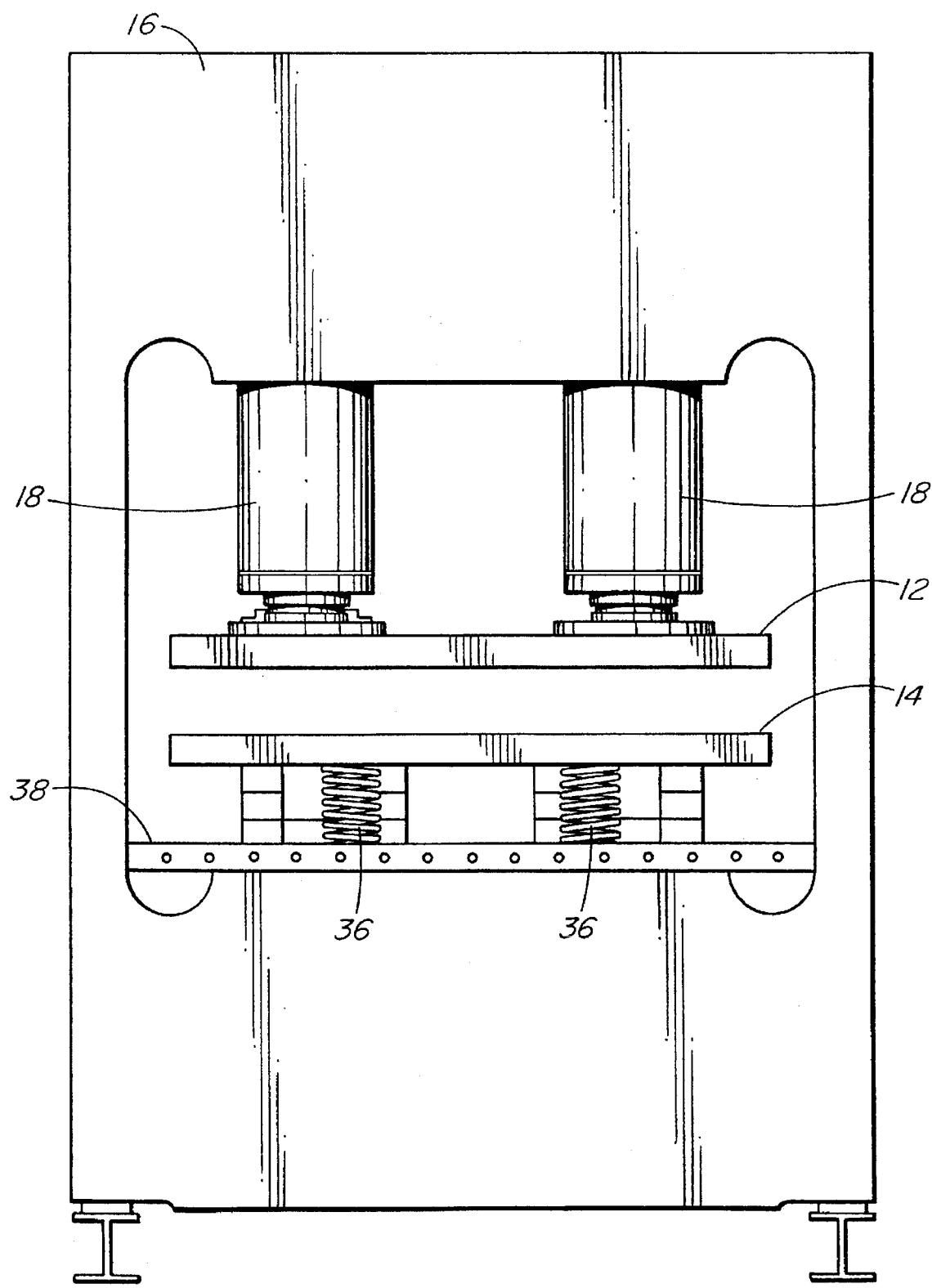
FIG. 4 is an enlarged rear elevation view of the FIG. 1 press.

Steel RF deflectors 24, 26 are welded onto each end of each of platens 12, 14. In one embodiment, deflectors 24, 26 may have a substantially triangular cross-section, when viewed in a longitudinally extending plane perpendicular to platens 12, 14. More particularly, as seen in FIG. 2, deflectors 24 have flat surfaces 28 which project upwardly and outwardly from the inner (i.e. lower) edges of the respective ends of upper platen 12 at a 45° angle and intersect the upper flat surface 30 of deflector 24 at another 45° angle. Similarly, deflectors 26 have flat surfaces 32 which project downwardly and outwardly from the inner (i.e. upper) edges of the respective ends of lower platen 14 at a 45° angle and intersect the lower flat surface 34 of deflector 26 at another 45° angle. Care is taken to remove sharp edges from deflectors 24, 26 and from all points at which deflectors 24, 26 respectively meet platens 12, 14.

Deflectors 24, 26 redirect RF energy which would otherwise be concentrated at the relatively sharp corners formed by the lower edges of upper platen 12 and the upper edges of lower platen 14. Such concentration allows undesirable RF leakage along the glue lines within the uncured part of billet 20 protruding from platens 12, 14 to the left (as viewed in FIG. 1). This is prevented by deflectors 24, 26.

More particularly, if relatively sharp corners are left at the lower edges of upper platen 12 and the upper edges of lower platen 14, many different voltage potentials are simultaneously imposed between the opposed upper and lower platen edges by the electromagnetic field between the platens. The different potentials result in undesirable effects as aforesaid. Deflectors 24, 26 reduce the divergence of the voltage potentials imposed between the opposed upper and lower platen edges, which in turn reduces the incidence of undesirable RF leakage.

Coils 36 are mounted between the undersides of each end of lower platen 14 and support plates 38 which are respectively fixed between frame members 16. The coils may be formed of copper tubing and provision may be made for coolant flow to through the coils. Coils 36 function as electrical inductors which are tuned to the RF frequency of press 10. Factors such as the coil diameter, radius of the tubing which forms the coil, etc. govern the electrical inductance characteristics of each coil, as is well known to those skilled in the art.

Coils 36 draw off some of the RF energy which concentrates at the edges of platens 12, 14 as aforesaid. However, the coils alone do not prevent unacceptable levels of RF leakage into the uncured portion of billet 20. Careful fabrication and installation of deflectors 24, 26 can however prevent such leakage, thereby facilitating the use of a dielectric heating effect in a continuous layup LVL press.

Figure 5:
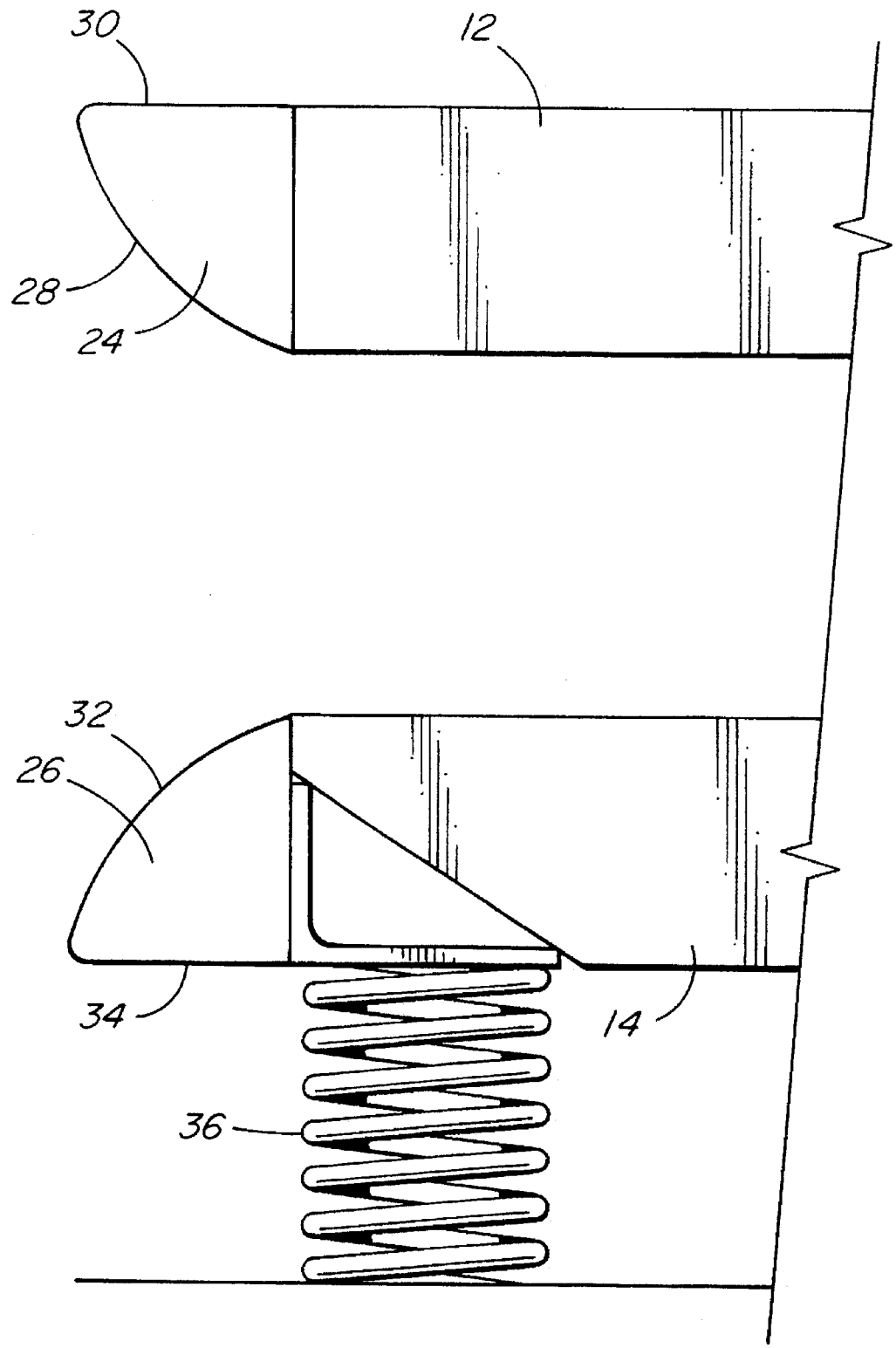
FIG. 5 is similar to FIG. 2, and shows an alternative configuration of the RF deflectors.
Figure 6:
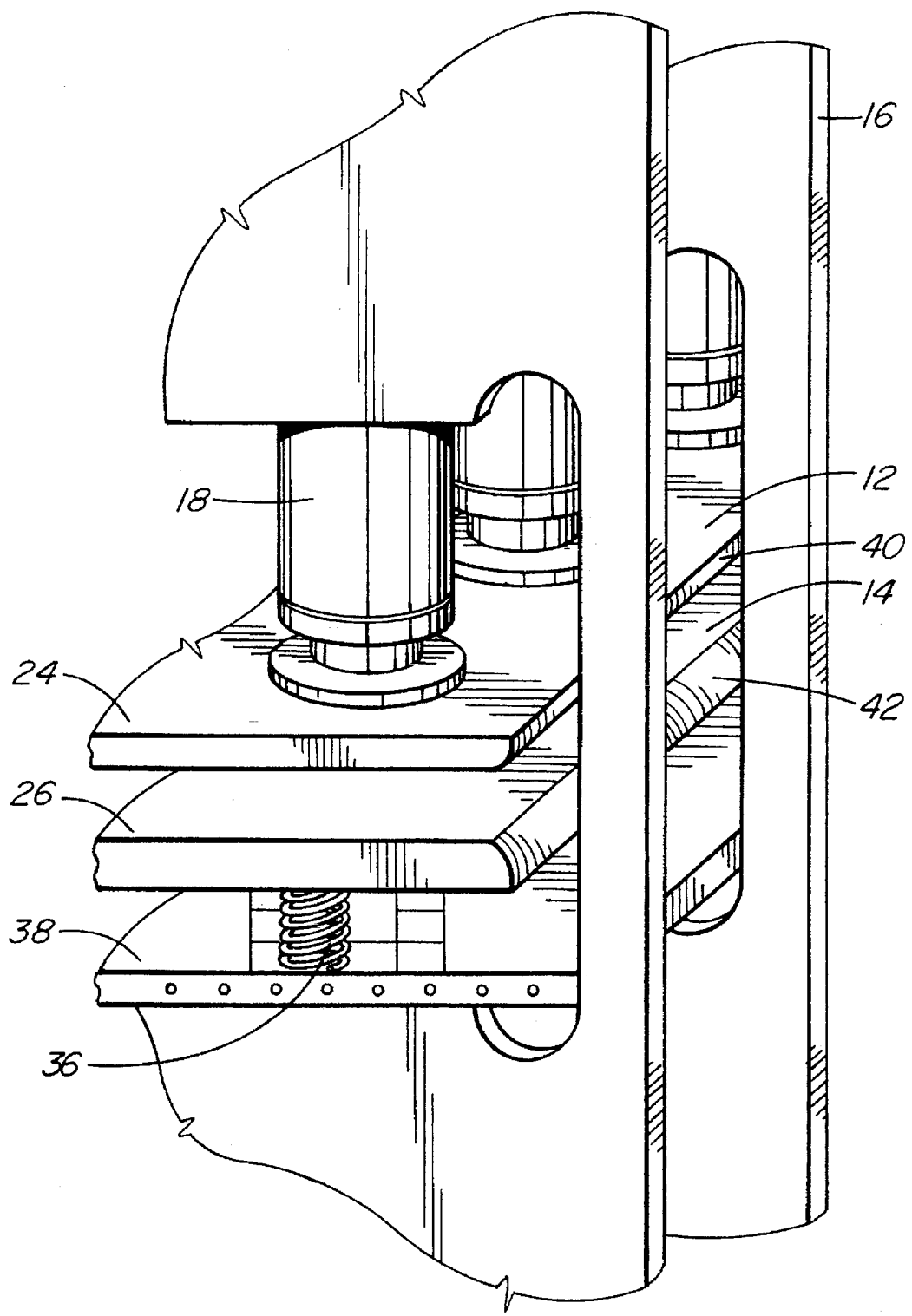
FIG. 6 is a pictorial illustration of one end of a continuous layup LVL press having RF deflectors configured in accordance with FIG. 5.

As will be apparent to those skilled in the art in the light of the foregoing disclosure, many alterations and modifications are possible in the practice of this invention without departing from the spirit or scope thereof. For example, deflectors 24, 26 need not be separate pieces welded onto platens 12, 14 but could be formed integrally at the platens' respective input ends. Further, deflectors 24, 26 need not be triangular, but may have a rounded or arcuate configuration as seen in FIGS. 5 and 6. This yields improved suppression of RF leakage, further reducing the undesirable effects of such leakage. Also, as seen in FIG. 6, RF deflectors may be provided not only at the ends of platens 14, 16 but also along each longitudinal edge 40, 42 thereof. Accordingly, the scope of the invention is to be construed in accordance with the substance defined by the following claims.

What is claimed is:

1. A method of making laminated veneer lumber in a continuous layup press having opposed press platens coupled to an RF energy source, said method comprising the steps of:

(a) shaping said platen ends in a cross-sectional plane of said press, such that said ends project outwardly away from respective inner edges of said platens;

(b) advancing part of a glued laminate billet to position said part between said platens;

(c) for a pre-determined time interval, activating said RF energy source while compressing said billet part between said platens;

(d) after said interval, releasing said platens;

(e) advancing said billet to eject said billet part from said platens and position a next adjacent part of said billet between said platens; and, (f) sequentially repeating steps (c), (d) and (e) until said billet has advanced completely through said press.

2. A method as defined in claim 1, wherein said shaping step further comprises shaping said ends to project at about a 45° angle between inner and outer edges of said respective platen ends.

3. A method as defined in claim 1, wherein said shaping step further comprises shaping said ends to extend in a convex arc between inner and outer edges of said respective platen ends.

4. A method as defined in claim 2 or 3, wherein said shaping step further comprises shaping opposed longitudinal edges of each of said platens to project outwardly away from respective inner longitudinal edges of said platens.

5. A method as defined in claim 1, wherein said opposed longitudinal edges are shaped to extend in a convex arc between inner and outer extremities of said respective platen longitudinal edges.

6. A method as defined in claim 2, wherein said triangular shaping step further comprises shaping said ends to project as flat surfaces between said inner and outer edges of said respective platen ends.

7. A method as defined in claim 2 or 3, wherein said shaping step further comprises removing all sharp edges on said platen ends.

* * * * *